United States Patent [19]
Venugopal et al.

[11] Patent Number: 5,549,987
[45] Date of Patent: Aug. 27, 1996

[54] POLYURETHANE BASED ELECTROLYTES FOR ELECTROCHEMICAL CELLS AND ELECTROCHEMICAL CELLS USING SAME

[75] Inventors: Ganesh Venugopal, Plantation; Veronica R. Reichert, Sunrise; Jinshan Zhang, Coral Springs, all of Fla.

[73] Assignee: Motorola, Inc., Schaumburg, Ill.

[21] Appl. No.: 279,131

[22] Filed: Jul. 22, 1994

[51] Int. Cl.$^6$ ................................................... H01M 10/40
[52] U.S. Cl. ........................ 429/188; 429/191; 429/192; 429/193; 252/62.2
[58] Field of Search .................................. 429/188, 191, 429/192, 193; 252/62.2

[56] References Cited

U.S. PATENT DOCUMENTS

| | | | |
|---|---|---|---|
| 3,967,978 | 7/1976 | Honda et al. | 136/146 |
| 5,019,467 | 5/1991 | Fujiwara | 429/127 |
| 5,061,581 | 10/1991 | Narang et al. | 429/192 |
| 5,196,484 | 3/1993 | Giles et al. | 525/314 |
| 5,198,521 | 3/1993 | Ehrhart et al. | 528/048 |
| 5,223,353 | 6/1993 | Ohsawa et al. | 429/192 |
| 5,407,593 | 4/1995 | Whang | 252/62.2 |

OTHER PUBLICATIONS

Poly(Dimethylsiloxane)–Poly(Ethylene Oxide) Based Polyurethane Networks Used as Electrolytes in Lithium Electrochemical Solid State Batteries, Solid State Ionics 15 (1985) 233–240, North–Holland, Amsterdam by A. Bouridah F. Dalard, D. Deroo and H. Chereadame, J. F. LeNest, Apr. 11, 1983.

Ionic Conductivity of Polyether–Polyurethane Networks Containing Alkali Metal Salts: An Analysis of the Concentration Effect, Macromolecules, 1984, 17, 63–66, by Andreas Killis, Jean–Francois LeNest, Alessandro Gandini and Herve Cheradame, 1984.

Mechanism High Ionic Conductivity in Elastomeric Networks, Journal of Power Sources, 9(1983) 389–395 by H. Cheradame A. Gandini, A. Killis and J. F. LeNest.

Polyaniline/Polyurethane, LiClO$_4$ Conducting Polymer Research Laboratories, British Polymer Journal 23 (1990) 151–155, 1990 by Chen Yi–Rui, Fang Dong–Fu and Xu–X-in–Hua.

Carbonxylate and Sulfonate Polyaddition Polymers, Polymer Research Laboratories, NHK Spring Company, Ltd., Department of Research and Development, Yokohama, Japan (No Date Available).

*Primary Examiner*—Stephen Kalafut
*Assistant Examiner*—Richard H. Lilley, Jr.
*Attorney, Agent, or Firm*—Kenneth M. Massaroni

[57] ABSTRACT

An electrolyte system (40) for use in connection with an electrochemical cell (10). The cell (10) includes a positive (20) and a negative (30) electrode and the electrolyte system (40) disposed there between. The electrolyte system (40) includes a liquid electrolyte adapted to provide ion transport between the positive and negative electrodes and a segmented block copolymeric support structure for engaging the liquid electrolyte.

14 Claims, 5 Drawing Sheets

POLYURETHANE BASED ELECTROLYTES FOR ELECTROCHEMICAL CELLS AND ELECTROCHEMICAL CELLS USING SAME

TECHNICAL FIELD

This invention relates in general to electrolytes for electrochemical cells, and more particularly to polymer electrolytes for such cells.

BACKGROUND OF THE INVENTION

There has been a great deal of interest in developing better and more efficient methods for storing energy for applications such as radio communication, satellites, portable computers and electric vehicles to name but a few. There have also been concerted efforts to develop high energy, cost effective batteries having improved performance characteristics, particularly as compared to storage systems known in the art.

Rechargeable, or secondary cells are more desirable than primary (non-rechargeable) cells since the associated chemical reactions which take place at the positive and negative electrodes of the battery are reversible. Electrodes for secondary cells are capable of being regenerated (i.e. recharged) many times by the application of an electrical charge thereto. Numerous advanced electrode systems have been developed for storing electrical charge. Concurrently, much effort has been dedicated to the development of electrolytes capable of enhancing the capabilities of electrochemical cells.

Heretofore, electrolytes have been either liquid electrolytes as are found in conventional wet cell batteries, or solid films as are available in newer, more advanced battery systems. Each of these systems have inherent limitations, and related deficiencies which make them unsuitable for various applications.

Liquid electrolytes, while demonstrating acceptable ionic conductivity, tend to leak out of the cells into which they are sealed. While better manufacturing techniques have lessened the occurrence of leakage, cells still do leak potentially dangerous liquid electrolytes from time to time. This is particularly true of current lithium ion cells. Moreover, any leakage from the cell lessens the amount of electrolyte available in the cell, thus reducing the effectiveness of the cell. Cells using liquid electrolytes are also not available for all sizes and shapes of batteries.

Conversely, solid electrolytes are free from problems of leakage. However, they have inferior properties as compared to liquid electrolytes. For example, conventional solid electrolytes have room temperature ionic conductivities in the range of $10^{-5}$ S/cm, whereas acceptable ionic conductivity is $>10^{-3}$ S/cm. Good ionic conductivity is necessary to ensure a battery system capable of delivering usable amounts of power for a given application. Good conductivity is necessary for the high rate operation demanded by, for example, cellular telephones and satellites. Accordingly, solid electrolytes are not adequate for many high performance battery systems.

Examples of solid polymer electrolytes include dry solid polymer systems in which a polymer, such as polyurethane, is mixed with an electrolyte salt in dry or powdered form. These types of systems are disclosed in, for example, Ionic Conductivity of Polyether-Polyurethane Networks Containing Alkali Metal Salts. An Analysis of the Concentration Effect, *Macromolecules*, Vol. 17, No. 1, 1984, pgs. 63–66, to Killis, et al; and Poly(dimethylsiloxane)—Poly(ethylene oxide) Based Polyurethane Networks Used As Electrolytes in Lithium Electrochemical Solid State Batteries, *Solid State Ionics*, 15 (1985) 233–240, to Bouridah, et al.. Unfortunately, these dry systems, like the solid electrolytes discussed above, are characterized by relatively poor ionic conductivity.

One solution which has been proposed relates to the use of so-called gel electrolytes for electrochemical systems. Gels, or plasticized polymeric systems are wet systems, not dry, as described above. Heretofore most gel electrolyte systems have been based on homopolymers, i.e., single polymer systems. Homopolymer-based gel electrolytes have not been successful as they tend to dissolve in higher concentrations of the electrolyte solvent, thus losing mechanical integrity.

Accordingly, there exists a need for a new electrolyte system which combines the mechanical stability and freedom from leakage offered by solid electrolytes with the high ionic conductivities of liquid electrolytes.

DETAILED DESCRIPTION OF THE PREFERRED EMBODIMENT

Figure 1:
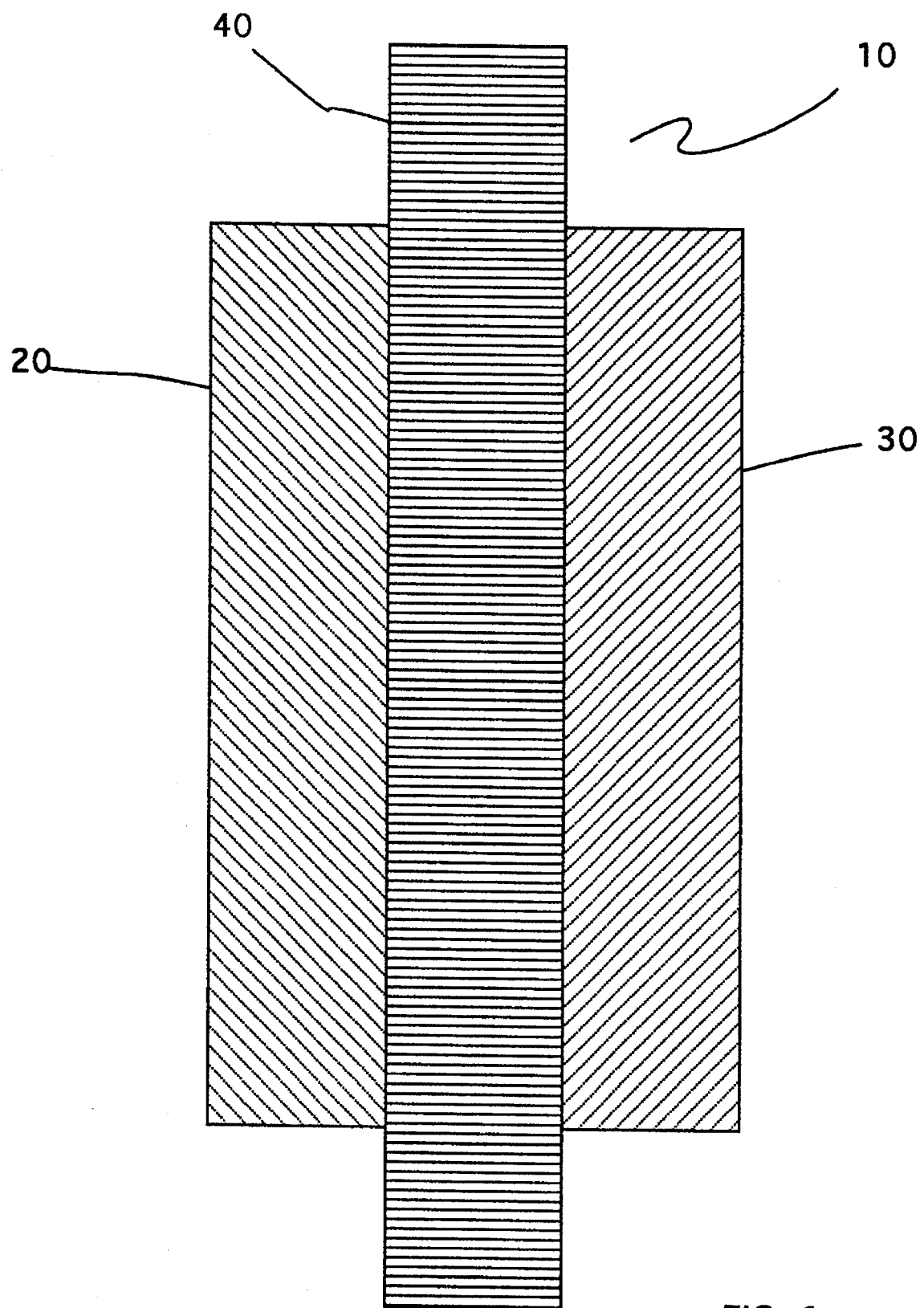
FIG. 1 is a schematic representation of an electrochemical cell in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of an electrochemical cell in accordance with the instant invention. The cell (10) includes a positive electrode (20) and a negative electrode (30). The positive electrode (20) may be fabricated of any of a number of chemical systems known to those of ordinary skill in the art. Examples of such systems include, but are not limited to, manganese oxide, nickel oxide, cobalt oxide, vanadium oxide, and combinations thereof. The negative electrode (30) may likewise be fabricated from any of a number of electrode materials known to those of ordinary skill in the art. Selection of the negative electrode material is dependent on the selection of the positive electrode so as to assure an electrochemical cell which will function properly for a given application. Accordingly, the negative electrode may be fabricated from, for example, alkali metals, alkali metal alloys, carbon, graphite, petroleum coke, and combinations thereof.

Operatively, disposed between the positive (20) and negative (30) electrodes is an electrolyte system (40). The electrolyte system (40) comprises an organic polymeric support structure adapted to engage, as for example, by absorption, an electrochemically active species or material. The electrochemically active material may be a liquid electrolyte, such as a metal salt that is dissolved in an organic solvent and which is adapted to promote ion transport between said positive (20) and negative (30) electrodes.

The liquid electrolyte absorbed by the organic support structure is selected to optimize performance of the positive (20) and negative (30) electrode couple. Therefore, in an embodiment for a lithium based electrochemical cell, the liquid electrolyte absorbed by the organic support structure is typically a solution of an alkali metal salt, or combination of salts, dissolved in an aprotic organic solvent or solvents. Typical alkali metal salts include, but are not limited to, salts having the formula $M^+X^-$ where $M^+$ is a alkali metal cation such as $Li^+$, $Na^+$, $K^+$ and combinations thereof; and $X^-$ is an anion such as $Cl^-$, $Br^-$, $I^-$, $ClO_4^-$, $BF_4^-$, $PF_6^-$, $AsF_6^-$, $SbF_6^-$, $CH_3CO_2^-$, $CF_3SO_3^-$, $(CF_3SO_2)_2N^-$, $(CF_3SO_2)_3C^-$, and combinations thereof. Aprotic organic solvents include, but are not limited to, propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof.

The organic polymeric support structure may be fabricated of a segmented block copolymer, that is a polymer that has at least two different blocks that form alternating segments along the polymer chain, each segment having different physical properties. An example of a segment block copolymer as used in the instant invention is the polyurethane thermoplastic elastomer which is a copolymer of a short-chain diisocyanate and a dihydroxy-terminated polyester (polyester diol). The condensation of these two species leads to the formation of a polymer having urethane linkages as illustrated in greater detail below.

The segmented block copolymer material from which the organic polymeric support structure is fabricated may be depicted as follows:

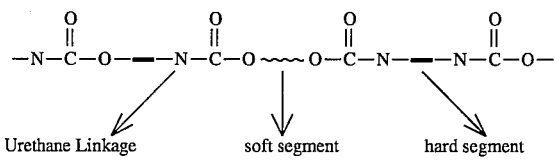

The short-chain diisocyanates provide the hard-rigid block segments of the copolymer. The short-chain diisocyanates are typically condensation products of diphenyl methane diisocyanate (MDI) and small molecule diols, for example, butane diol or ethylene glycol, or small molecule diamines such as 4-4'methylene bis(2-chloroaniline). The short-chain diols/diamines are also referred to as chain-extenders. The condensation reaction leading to the formation of the diisocyanate-terminated hard block segments may be described as follows:

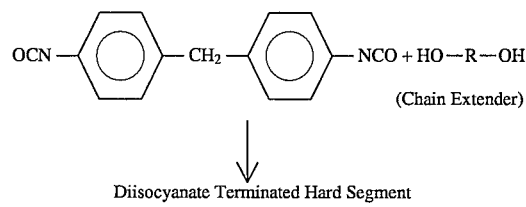

The long chain diols provide the soft block segment of the copolymer, and are typically relatively high-molecular weight (<3500 g/M) hydroxyl terminated polyesters or hydroxyl terminated polyethers. In one preferred embodiment the polyester is a polybutylene adipate (molecular weight approximately 2000 g/M). Alternatively, the polyester diols may be, for example, polyethylene adipate, polycaprolactone and combinations thereof. The long-chain diols forming the soft blocks typically appear as follows:

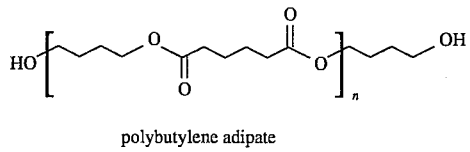

polybutylene adipate

The hard block segments are known to aggregate through hydrogen bonding thus behaving as physical crosslinks for the soft block segments. As a result the polymeric material is an elastomer, that is, a rubbery material. Further, the hydrogen bonds responsible for aggregation of the hard blocks may be broken at high temperatures allowing the materials to behave as a thermoplastic. This property of the polyurethane offers an immense processing advantage since it may be processed into sheets and films using conventional polymer processing equipment, like those used for conventional thermoplastics, at high temperatures while behaving like elastomers at lower temperatures.

Figure 2:
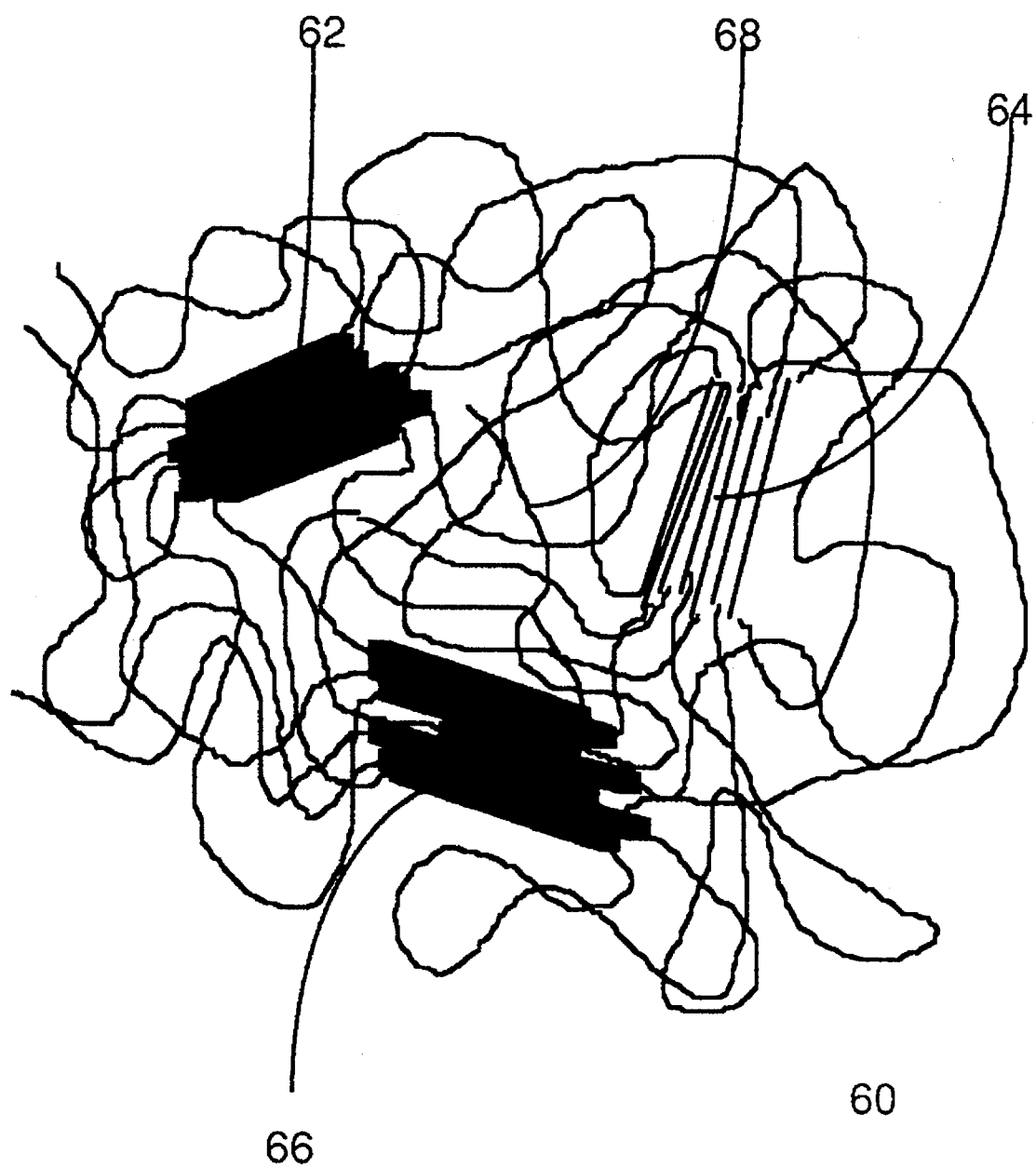
FIG. 2 is a schematic morphology of unstretched segmented block polyurethane copolymers in accordance with the instant invention.

Referring now to FIG. 2, there is illustrated therein the schematic morphology of an unstretched segmented block polyurethane copolymer in accordance with the instant invention. The copolymer (60) is characterized by two general types of polymeric segments; a plurality of hard block segments (62, 64, and 66) which behave as physical crosslinks or backbone of the polymeric material. Disposed around and between the bodies of hard block segments are the long flexible chain polyester diols forming the soft block segment (68) of the copolymer material (60).

Exemplary materials which may be used as the segmented block copolymers for the organic polymeric support structure of the instant invention include a polyurethane, (either polyether or polyester based), polyester-polyether systems, polycarbonate-polyether systems and combinations thereof. Examples of segmented polyurethanes include Miles Laboratories Texin™ 480A, 455A, and 360D polyester/polyurethane material. These materials are approximately 2000 molecular weight alcohol terminated aliphatic polyesters, for example polyethylene or polybutylene adipates, condensed with a diisocyanate made from MDI and a chain extender, as discussed above. Other examples of polyester-polyurethanes include B. F. Goodrich's Estane™ 58206 and 58209, which are polyurethanes formed by the condensation of MDI-containing diisocyanates with alcohol terminated polyesters such as polyethylene and/or polybutylene adipates, polycaprolactone or polyesters containing aromatic moieties. Similar polyester based polyurethanes are also available from Dow Corporation under the name Pollethane™ 2355-75A and 2102-75A.

Heretofore, most blends of electrochemically active materials such as electrolytes and polymers other than polyurethane resulted in a significant deterioration of the mechanical properties of the polymer, usually forming tacky, viscous fluids. Further, prior art combinations of polymers with electrolytes resulted in electrolytic behavior considerably lower than that considered acceptable in most electrochemical systems. Accordingly, an electrolyte in accordance with the instant invention has ionic conductivity as high as $10^{-3}$ S/cm at room temperature, and has demonstrated excellent mechanical properties such as a shear modulus of approximately $1\times10^5$ $P_a$ at 30° C. Moreover, being elastomeric thermoplastics, these materials may form intimate contact with positive (20) and negative (30) electrodes.

More particularly, a polyurethane/liquid electrolyte system (40) in accordance with the instant invention may be mixed with cathode powders such as lithium manganese oxide, lithium nickel oxide or lithium cobalt oxide to form composite cathodes. Cathodes made in this fashion are essential for batteries which use polymer-based electrolytes since intimate contact between the active electrolyte material and the cathode cannot otherwise be achieved. It may further be appreciated that polyurethane liquid electrolyte blends in accordance with the instant invention may also be used to form composite anodes for batteries where lithium cannot be used.

The instant electrolyte system also has the important advantage of having a polymeric support structure which is easily processable and reprocessable, since the materials are thermoplastic elastomers. Other prior art gel systems are typically permanently chemically cross-linked either by radiation (e-beam, UV, etc.), or by using a chemical crosslinking agent, for example diisocyanates which can be used to cross-link polyether triols.

The following examples are intended to illustrate the advantages of the instant invention and they are not intended to be limitations thereon.

EXAMPLE I

A polyurethane based electrolyte system in accordance with the instant invention was made by the solvent casting technique. 0.5 grams of Miles Texin 480A, polyester/polyurethane and 2.0 g of a 1M solution of lithium tetrafluoroborate ($LiBF_4$) solution in propylene carbonate were dissolved in approximately 8 g of tetrahydrofuran (THF). This solution was poured into an aluminum dish and the THF was allowed to evaporate overnight yielding a film of the polyurethane based electrolyte. The resulting electrolyte system was comprised of approximately 80 wt % of the liquid electrolyte (propylene carbonate/$LiBF_4$).

Figure 3:
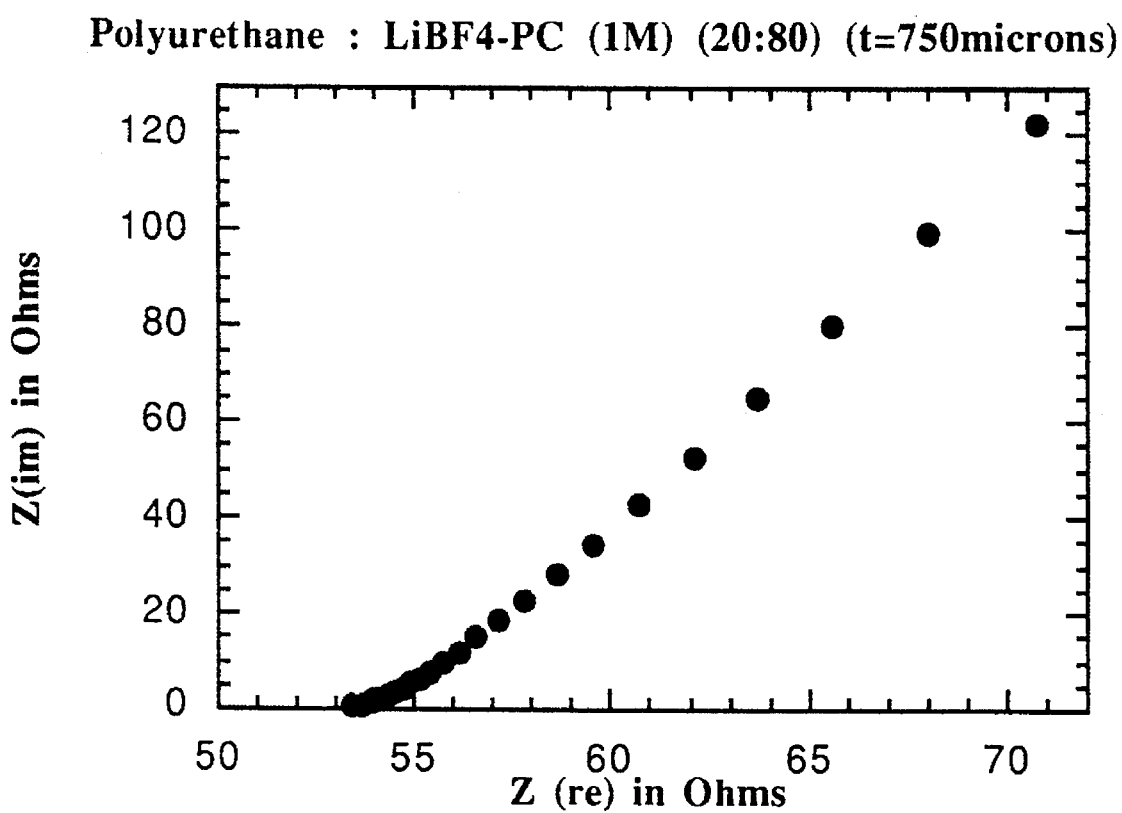
FIG. 3 is an AC impedance spectrum of a polyurethane/liquid electrolyte system in accordance with the instant invention.

Referring now to FIG. 3, there is illustrated therein the AC impedance spectrum of polyurethane blended with 80% (by weight) of 1M solution of lithium tetrafluoroborate and propylene carbonate as described above. The resistance of the film was approximately 55 Ohms. The thickness of the sample was approximately 0.075 cm with a cross-sectional area of approximately 1 $cm^2$. Based upon this and as illustrated by the series of points shown in FIG. 3, the conductivity of the film was calculated to be approximately $1.4\times10^{-3}$ S/cm.

EXAMPLE II

A second polyurethane based electrolyte was made by the solvent casting technique as follows. 0.5 grams of a Miles Texin™ 480A polyester polyurethane and 0.8 grams of 1M solution of $LiBF_4$ solution in propylene carbonate (PC) were dissolved in about 8 grams of THF. The solution was poured in an aluminum dish and the THF was allowed to evaporate overnight yielding a film of the polyurethane based electrolyte. The resulting electrolyte comprised of 62 wt % of the liquid electrolyte (PC-$LiBF_4$). Samples (approximately 1 $cm^2$ in area and 0.036 cm thick) for conductivity measurements were cut out from this solvent cast film. The resistance of the film was 130 Ohms and the conductivity was calculated to be $3\times10^{-4}$ S/cm.

Figure 4:
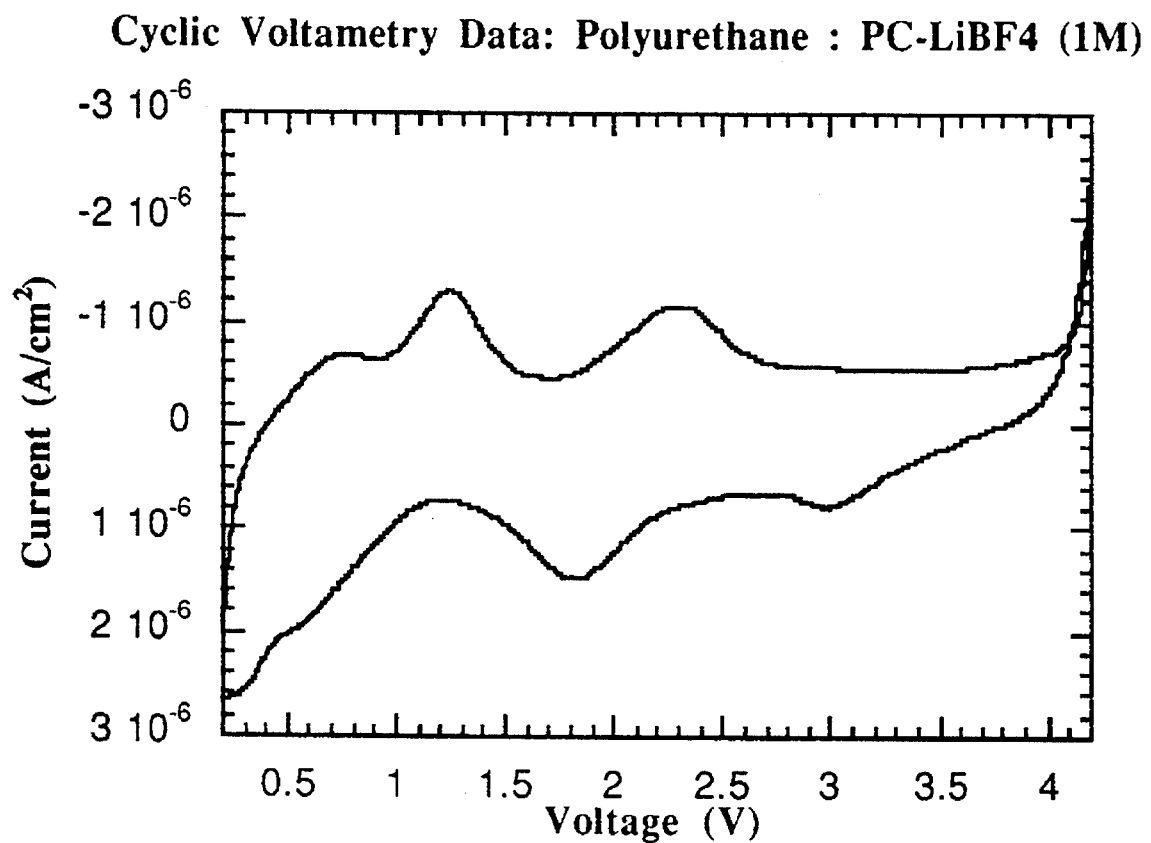
FIG. 4 is a cyclic voltammagram of a polyurethane/liquid electrolyte blend.

Referring now to FIG. 4, there is illustrated therein a cyclic voltammagram for the material obtained as described above. Data was collected at a scan rate of approximately 1 mV/s with platinum mesh working and counter electrodes, and a lithium reference electrode.

Cyclic voltammetry studies of the polyurethane electrolyte indicated that the material has good electrochemical stability in the voltage range between 0.2 and 4.2 V. The steep increase at around 4.2 V indicates that the electrolyte is beginning to oxidize at this voltage. The source of the two peaks in the range 1 to 3.5 V is not known and may be attributed to impurities in the polyurethane based electrolyte system. However, it is important to note that the current (y-axis) scale of these peaks is only in the microamp range and hence the concentration of the electrochemically active species involved is quite small.

EXAMPLE III

A third polyurethane based electrolyte was made by the solvent casting technique as follows. 0.5 grams of Miles Texin™ 480A polyester polyurethane and 4.5 grams of 1M solution of $LiBF_4$ solution in propylene carbonate were dissolved in about 8 grams of THF. The solution was poured in an aluminum dish and the THF was allowed to evaporate overnight yielding a film of the polyurethane based electrolyte. The resulting electrolyte comprised 90 wt % of the liquid electrolyte (PC-$LiBF_4$). Samples (approximately 1 cm2 in area and 0.097 cm thick) for conductivity measurements were cut out from this solvent cast film. The resistance of the film was 47 ohms and the conductivity was calculated to be $3\times10^{-3}$ S/cm.

EXAMPLE IV

Polyurethane gels may also be made without the use of casting solvents like THF, as follows: Polyurethane films, approximately 0.058 cm in thickness, were made by compression molding at around 170° C. in a Carver press. These films were then soaked in 1M solution of lithium tetrafluoroborate solution in propylene carbonate. After 48 hours the resulting polyurethane-liquid electrolyte blend contained about 63% of the liquid electrolyte. The sample thickness increased to 0.081 cm. Samples (approximately 1 $cm^2$ in area) for conductivity measurements were cut out from this swollen film. The resistance of the film was 178 Ohms and the conductivity was calculated to be around $4.5\times10^{-4}$ S/cm.

Figure 5:
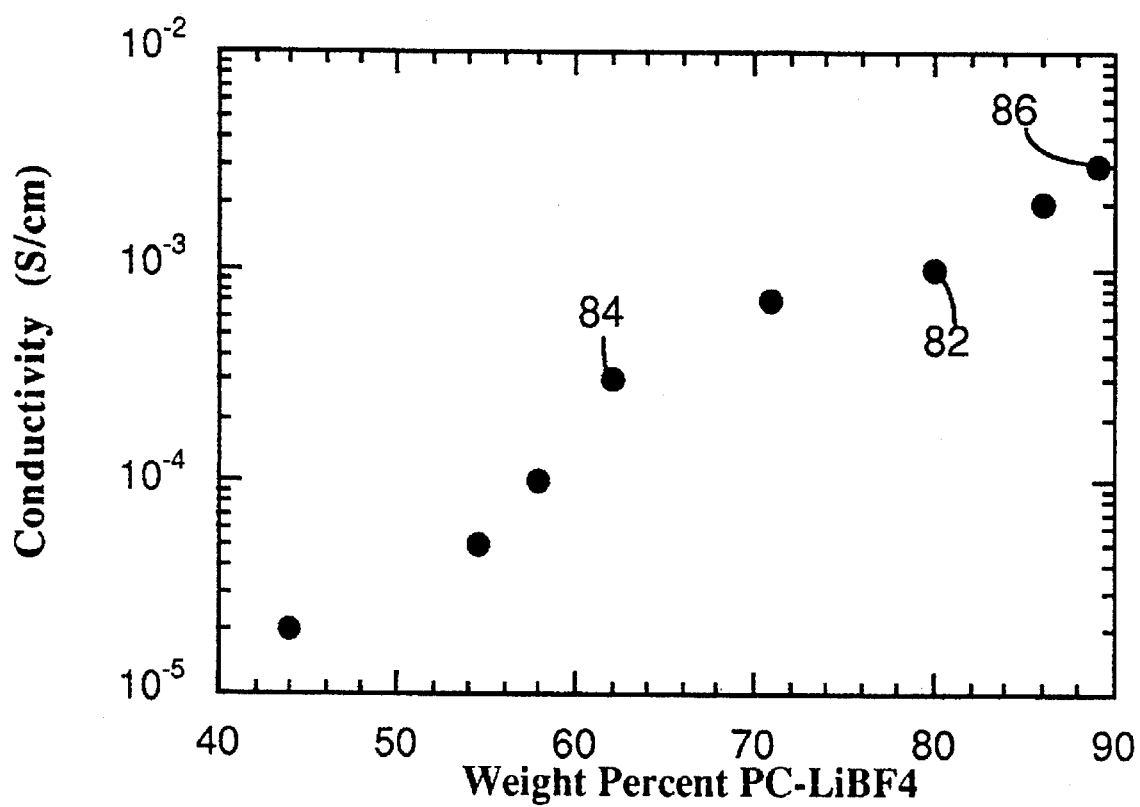
FIG. 5 is a chart illustrating the conductivity of solvent-cast polyurethane/liquid electrolyte blends as a function of electrolyte composition

Referring now to FIG. 5, there is illustrated therein a chart demonstrating the conductivity of solvent cast/polyurethane liquid electrolyte blends as a function of liquid electrolyte composition. In this regard, the conductivity of Example I is illustrated at Point 82 while the conductivity of Examples II and III are illustrated by Points 84 and 86 respectively. As may be appreciated from a perusal of FIG. 5, numerous other samples having greater and lesser weight percents of liquid electrolyte in the solvent cast polyurethane material are illustrated. From this chart, one may conclude that with increasing wt % of the liquid electrolyte material, conductivity similarly increases. Limitations to increased conductivity are derived principally from decreasing mechanical stability of the polyurethane support structure with increased concentrations of the liquid electrolyte. It is important to note, however, that wt % as high as those illustrated by Point 86 demonstrate quite acceptable conductivity while retaining excellent mechanical properties.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte system for use in an electrochemical cell having positive and negative electrodes, said electrolyte system comprising:

a polymeric support structure fabricated of a segmented block copolymer comprising a first block consisting of hydroxyl terminated polyesters and polyethers selected from the group consisting of polybutylene adipate, polyethylene adipate, polycaprolactone, and combinations thereof, a second block consisting of diisocyanates resulting from the condensation products of diphenyl urethane, diisocyanate and a chain extender selected from the group consisting of butane diol, ethylene glycol, and 4–4' methylene bis(2-chloroaniline), said first and second blocks being joined by a urethane linkage interposed therebetween; and an electrochemically active electrolyte species dispersed in said polymeric support structure.

2. An electrolyte system as in claim 1, wherein said electrolyte species is a liquid electrolyte.

3. An electrolyte system as in claim 2, wherein said liquid electrolyte is an alkali metal salt dissolved in an aprotic organic solvent.

4. An electrolyte system as in claim 3, wherein said alkali metal salt is selected from the group consisting of materials having the formula $M^+X^-$ where:

$M^+$ is an alkali metal cation such as $Li^+$, $Na^+$, or $K^+$, and;

$X^-$ is an ion such as $Cl^-$, $Br^-$, $I^-$, $ClO_4^-$, $BF_4^-$, $PF_5^-$, $AsF_6^-$, $SbF_6^-$, $CH_3CO_2^-$, $CF_3SO_3^-$, $(CH_3CO_2)_2N^-$, $(CF_3SO_2)_3C^-$, and combinations thereof.

5. An electrolyte system as in claim 3, wherein said aprotic organic solvent is selected from the group consisting of propylene carbonate, ethylene carbonate, diethylcarbonate, dimethyl carbonate, dipropylcarbonate, dimethyl sulfoxide, acetonitrile, dimethyloxyethane, diethoxyethane, tetrahydrofuran and combinations thereof.

6. An electrolyte system as in claim 1, wherein said electrochemically active electrolyte species is $LiBF_4$ in propylene carbonate.

7. An electrolyte system as in claim 1, wherein said electrolyte is absorbed in said first block of said segmented block copolymer.

8. An electrochemical cell comprising a positive electorde, a negative electrode, and a polymer electrolyte disposed therebetween, said polymer electrolyte comprising a segmented block copolymer having a first block consisting of hydroxyl; terminated polyesters and polyethers selected from the group of polybutylene adipate, polyethylene adipate, polycaprolactone, and combinations thereof, a second block consisting of diisocyanates resulting from the condensation of diphenylmethane, diisocyanate, and a chain extender selected from the group consisting of butane diol, ethylene glycol, and 4–4' methyllene (bis-2-chloroaniline), said first and secoind blocks being joined by urethane linkages disposed therebetween, said segmented block copolymer electrode having dispersed therein an electrochemically active electrolyte species.

9. An electrochemical cell as in claim 8, wherein said electrolyte species is a liquid electrolyte.

10. An electrochemical cell as in claim 9, wherein said liquid electrolyte is an alkali metal salt dissolved in an aprotic organic solvent.

11. An electrochemical cell as in claim 10, wherein said alkali metal salt is selected from the group consisting of materials having the formula $M^+X^-$ where:

$M^+$ is an alkali metal cation such as $Li^+$, $Na^+$, or $K^+$; and $X^-$ is an ion such as $Cl^-$, $Br^-$, $I^-$, $ClO_4^-$, $BF_4^-$, $PF_5^-$, $AsF_6^-$, $SbF_6^-$, $CH_3CO_2^-$, $CF_3SO_3^-$, $(CH_3CO_2)_2N^-$, $(CF_3SO_2)_3C^-$, and combinations thereof.

12. An electrochemical cell as in claim 10, wherein said aprotic organic solvent is selected from the group consisting of propylene carbonate, ethylene carbonate, diethylcarbonate, dimethyl carbonate, dipropylcarbonate, dimethyl sulfoxide, acetonitrile, dimethyloxyethane, diethoxyethane, tetrahydrofuran and combinations thereof.

13. An electrochemical cell as in claim 8, wherein said electrochemically active electrolyte species is $LiBF_4$ in propylene carbonate.

14. An electrochemical cell as in claim 8, wherein said electrolyte species is absorbed in said first block of said segmented block copolymer.

\* \* \* \* \*